United States Patent
Kino (10) Patent No.: US 8,561,160 B2
(45) Date of Patent: Oct. 15, 2013

(54) AUTHENTICATION SYSTEM, IMAGE FORMING APPARATUS, AND AUTHENTICATION SERVER

(75) Inventor: Tetsuro Kino, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 866 days.

(21) Appl. No.: 12/219,817

(22) Filed: Jul. 29, 2008

(65) Prior Publication Data

US 2009/0037981 A1 Feb. 5, 2009

(30) Foreign Application Priority Data

Jul. 31, 2007 (JP) ................................. 2007-199912

(51) Int. Cl.
*G06F 21/00* (2006.01)
(52) U.S. Cl.
USPC ................................. 726/7; 713/182; 726/19
(58) Field of Classification Search
None
See application file for complete search history.

(56) References Cited

U.S. PATENT DOCUMENTS

| 2006/0005038 A1* | 1/2006 | Kitahara et al. ............... 713/182 |
| 2007/0107042 A1 | 5/2007 | Corona | |
| 2008/0040778 A1* | 2/2008 | Sato ................................... 726/4 |

FOREIGN PATENT DOCUMENTS

| EP | 1 465 051 | 10/2004 |
| EP | 1 696 311 | 8/2006 |
| JP | 2003-233279 | 8/2003 |

OTHER PUBLICATIONS

European Search Report dated Jan. 30, 2009.

* cited by examiner

*Primary Examiner* — Gilberto Barron, Jr.
*Assistant Examiner* — Izunna Okeke
(74) *Attorney, Agent, or Firm* — Harness, Dickey & Pierce, P.L.C.

(57) ABSTRACT

An authentication system includes an authentication information input device to which a user inputs authentication information, an authentication server, and at least one image forming apparatus, all connected via a network. The authentication server acquires the authentication information input via the authentication information input device and performs user authentication based on the authentication information. The authentication server includes a transmitter to transmit a result of the user authentication indicating whether or not the user authentication is successful and information of the user identified by the authentication information to at least one of the image forming apparatuses. The image forming apparatus includes a receiver to receive the result of the user authentication and the user information transmitted from the authentication server, and an apparatus controller to switch the image forming apparatus from an unusable state to a usable state according to the result of the user authentication and the user information.

15 Claims, 9 Drawing Sheets

PRESENT AUTHENTICATION INFORMATION OR ENTER
USERNAME AND PASSWORD AND PRESS LOGIN BUTTON

USERNAME [         ] [ENTER]

PASSWORD [         ] [ENTER]

[CANCEL]                              [LOGIN]

FIG. 9

|   | AUTHENTICATION INFORMATION INPUT DEVICE | IMAGE FORMING APPARATUS |
|---|---|---|
| 1 | AA-BB-CC-DD-EE-FF | 11-22-33-44-55-66 |
| 2 | BB-CC-DD-EE-FF-AA | 22-33-44-55-66-11 |
| 3 | CC-DD-EE-FF-AA-BB | 33-44-55-66-11-22 |

AUTHENTICATION SYSTEM, IMAGE FORMING APPARATUS, AND AUTHENTICATION SERVER

CROSS-REFERENCE TO RELATED APPLICATIONS

This patent specification claims priority from Japanese Patent Application No. 2007-199912, filed on Jul. 31, 2007 in the Japan Patent Office, the entire contents of which are hereby incorporated by reference herein.

BACKGROUND OF THE INVENTION

1. Field of the Invention

The present invention generally relates to an authentication system, an authentication control method, an image forming apparatus, and an authentication server.

2. Discussion of the Background Art

Integrated circuit (IC) cards are widely used. For example, many identification cards (IDs), such as employee IDs and student IDs, used to identify individuals are IC cards. Further, restriction of use of computers, etc., using IC cards has been realized.

Many offices use image forming apparatuses such as copiers, facsimile machines, printers, and multifunction apparatuses capable of two or more of those functions, and a method to authenticate users of such multifunction apparatuses, as well as computers, using IC cards has been proposed for security reasons. Further, a user authentication system to authenticate users based on individual biometric information has been proposed.

For example, one known image input and output apparatus restricts users who can execute certain specific type of image processing. In this image input/output apparatus, users of specific image processing can be restricted through a method including inputting image data, inputting biometric information of a user requesting a specific image processing, storing the biometric information, cross-checking the biometric information with registered biometric information, and performing the requested image processing according to results of the cross-check.

Thus, various types of personal authentication methods, such as the user authentication system using IC cards and the biometric authentication system using biometric information described above, are currently used.

In order to correspond to various types of user authentication methods requested by users, the image forming apparatus should control various types of authentication devices, which requires implementation of programs to control various types of authentication devices and increases development cost. Hereinafter those control programs are referred to as firmware.

In particular, it is difficult to change firmware of the image forming apparatus that is an embedded device, and work required to maintain quality increases when the firmware is changed. Thus, it is difficult to change the firmware of each image forming apparatus in order to correspond to various types of user authentication methods.

Further, in the biometric authentication method, processing of biometric information acquired via an authentication device is required in order to identify a person based thereon. Because a heavier load is required to execute such information processing by using software, the image forming apparatus does not have sufficient capacity, and consequently it takes a relatively long time to authenticate the user.

SUMMARY OF THE INVENTION

In view of the foregoing, in one illustrative embodiment of the present invention, an authentication system includes an authentication information input device, an authentication server, and at least one image forming apparatus, connected to each other via a network. The authentication information input device is provided with an authentication information input unit through which a user inputs authentication information. The authentication server acquires the authentication information input via the authentication information input device, and performs user authentication based on the authentication information. The authentication server includes a transmitter to transmit a result of user authentication indicating whether or not the user authentication is successful and information of the user identified by the authentication information to the at least one image forming apparatus. The image forming apparatus includes a receiver to receive the result of the user authentication and the user information transmitted from the authentication server, and an apparatus controller to switch the image forming apparatus from an unusable state to a usable state according to the result of the user authentication and the user information.

In another illustrative embodiment of the present invention, an image forming apparatus used in the authentication system described above includes a receiver configured to receive a result of user authentication and user information transmitted from the authentication server.

Yet in another illustrative embodiment of the present invention, an authentication server used in the authentication system described above includes a transmitter configured to transmit a result of user authentication indicating whether or not user authentication is successful and information of the user identified by the authentication information to at least one of the image forming apparatuses.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Figure 1:
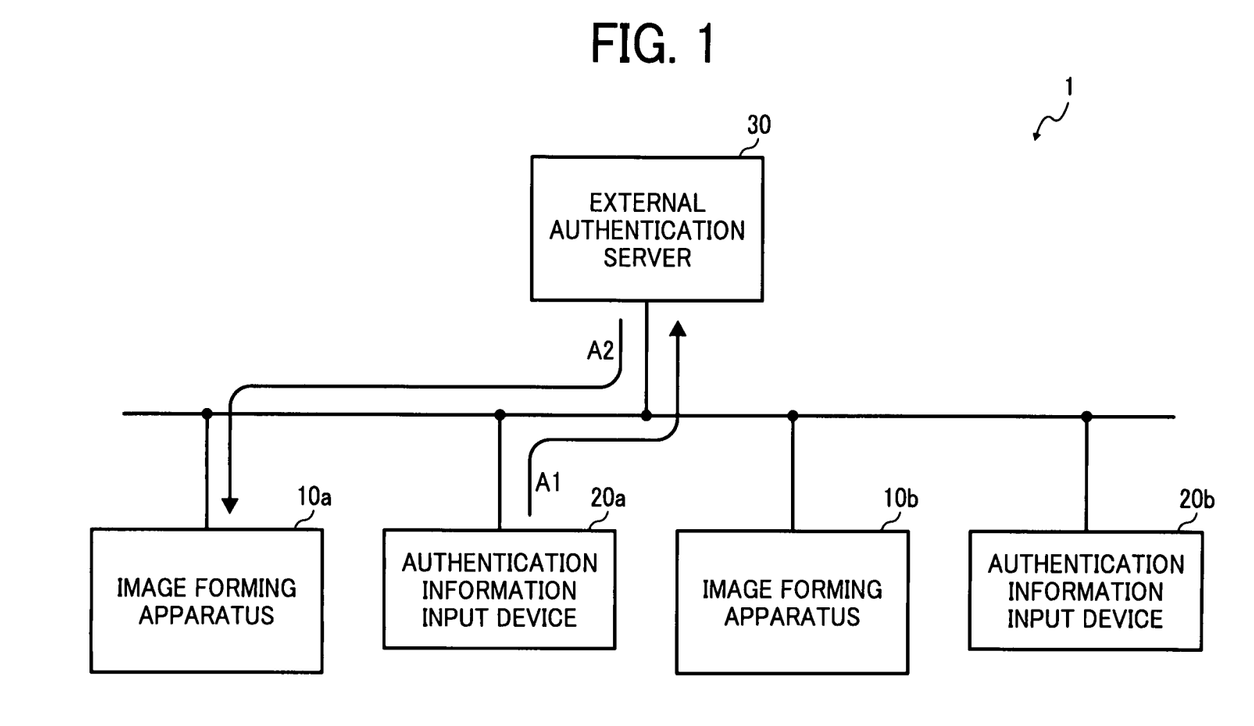
FIG. 1 illustrates an example of an authentication system according to an illustrative embodiment of the present invention.

Referring now to the drawings, wherein like reference numerals designate identical or corresponding parts throughout the several views thereof, and particularly to FIG. 1, a configuration of an authentication system according to an illustrative embodiment of the present invention is described.

Referring to FIG. 1, an authentication system 1 according to the present embodiment includes image forming apparatuses 10a and 10b, authentication information input devices 20a and 20b, and an external authentication server 30 that are connected to each other via a network such as a local area network (LAN).

It is to be noted that, when discrimination therebetween is not required, each of the image forming apparatuses 10a and 10b is hereinafter collectively referred to as an image forming apparatus 10 and each of the authentication information input devices 20a and 20b is hereinafter collectively referred to as an authentication information input device 20.

Examples of the image forming apparatuses 10 include copiers, printers, facsimile machines, and multifunction machines including functions of at least two of scanning, copying, printing, and faxing.

The authentication information input devices 20 are used to input authentication information. Examples of the authentication information input devices 20 include a reader to read authentication information stored on a recording medium, such as an integrated circuit (IC) card, and biometric information such as a fingerprint.

The authentication information input devices 20 can be controlled via the network, a network interface, a local interface, and a converter between the network interface and the local interface, etc. When a user instructs the authentication system 1 to authenticate himself/herself, the authentication information input device 20 obtains authentication information regarding that user and outputs that authentication information to the external authentication server 30.

The external authentication server 30 performs authentication processes. For example, external authentication server 30 obtains authentication information via the authentication information input device 20, converts the authentication information into referable authentication data, and then refers to an authentication database, not shown, for the authentication data. The external authentication server 30 can further control the authentication information input device 20.

In the authentication system 1 having the configuration described above, each authentication information input device 20 is located physically close to one image forming apparatus and associated therewith.

In the example shown in FIG. 1, the information input device 20a is associated with the image forming apparatus 10a. The user operates the authentication information input device 20a to be authenticated as indicated by arrow A1, and the user can start to use the image forming apparatus 10a after the external authentication server 30 authenticates the user and then notifies the image forming apparatus 10a that the user is authenticated as indicated by arrow A2.

Figure 2:
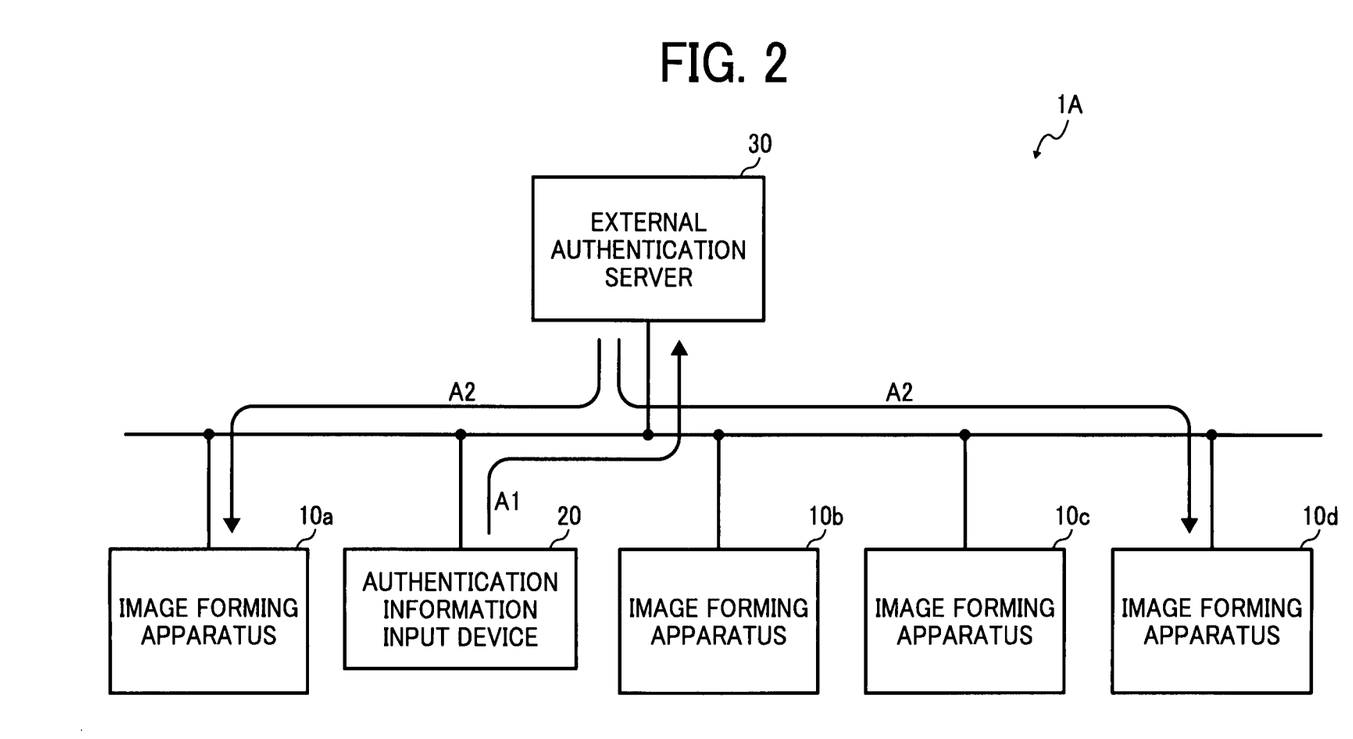
FIG. 2 illustrates another example of an authentication system according to an illustrative embodiment of the present invention.

FIG. 2 shows an authentication system 1A according to another illustrative embodiment of the present invention. In the authentication system 1A, image forming apparatuses 10a, 10b, 10c, and 10d, an authentication information input device 20, and an external authentication server 30 are connected to each other via a network such as a LAN. The image forming apparatuses 10a, 10b, 10c, and 10d are hereinafter collectively referred to as image forming apparatuses 10 when discrimination therebetween is not required.

The image forming apparatuses 10, the authentication information input device 20, and the external authentication server 30 are similar to those shown in FIG. 1, and thus descriptions thereof are omitted.

In the authentication system 1A shown in FIG. 2, multiple image forming apparatuses 10 are associated with a single authentication information input device 20, which is different from the authentication system 1 shown in FIG. 1. More specifically, FIG. 2 shows an example in which two image forming apparatuses, the image forming apparatuses 10a and 10d, are associated with the authentication information input device 20.

The user inputs his/her authentication information via the authentication information input device 20 as indicated by arrow A1, and the external authentication server 30 receives the authentication information and then performs the authentication processes. When the authentication processes are successful, the authentication server 30 outputs results of authentication to the multiple image forming apparatuses 10 with which the authentication information input device 20 is associated as indicated by arrow A2. More specifically, in the example shown in FIG. 2, the authentication server 30 notifies the image forming apparatuses 10a and 10d of results of authentication.

Figure 3:
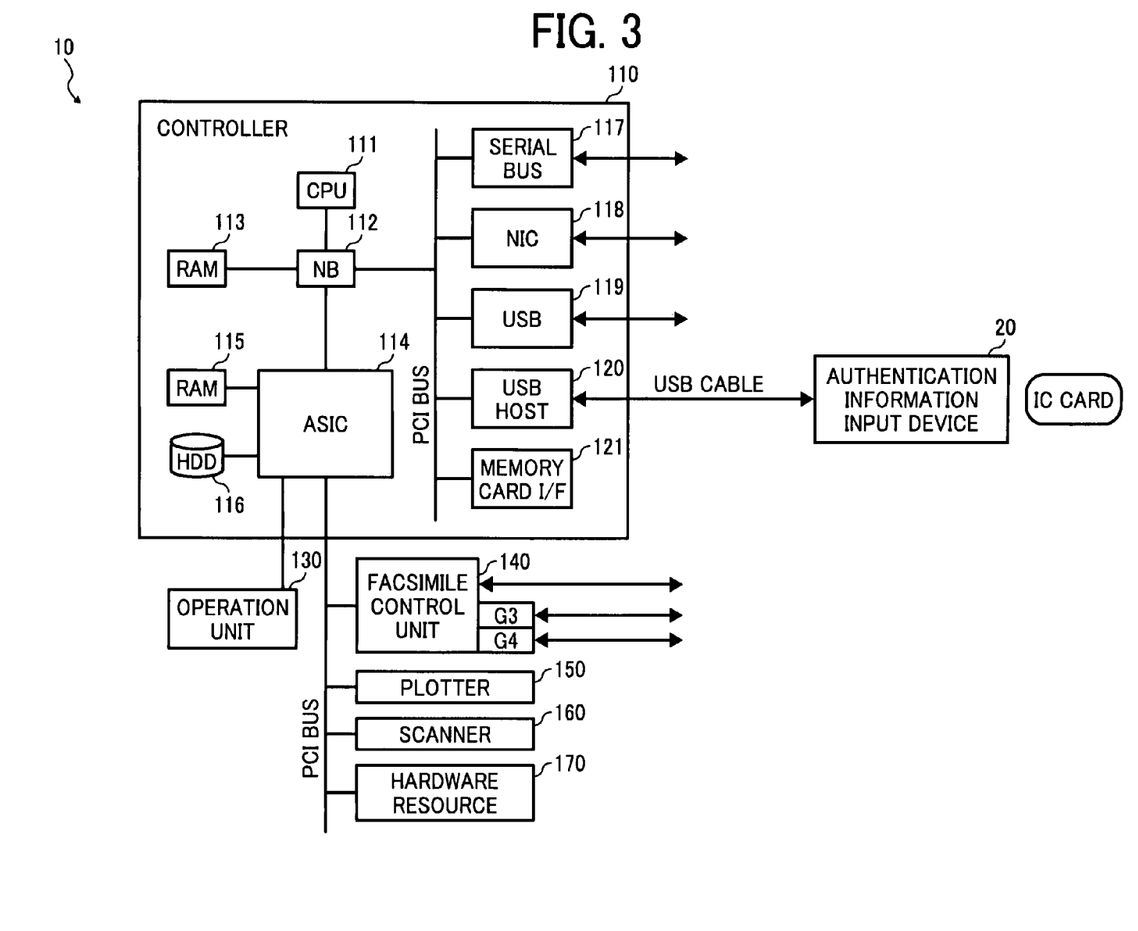
FIG. 3 illustrates an example of a hardware configuration of an image forming apparatus included in the authentication system shown in FIG. 1.

FIG. 3 illustrates a hardware configuration of the image forming apparatus 10.

As shown in FIG. 3, the image forming apparatus 10 includes a controller 110, an operation unit 130, a facsimile control unit 140, a plotter 150, a scanner 160, and a hardware resource 170 that is another hardware resource.

Further, the image forming apparatus 10 connects to the authentication information input device 20 via the USB host 120 using a USB cable, and the authentication information input device 20 is an IC card reader and writer (R/W) in the example shown in FIG. 3.

The controller 110 controls respective portions of the image forming apparatus 10 using a central processing unit (CPU) 111, a north bridge (NB) 112, a random access memories (RAM) 113 and 115, an application specific integrated circuit (ASIC) 114, a hard disk drive (HDD) 116 serving as a hard disk reader, a serial bus 117, a network interface card (NIC) 118, a universal serial bus (USB) 119, a USB host 120, and a memory card interface 121.

The CPU 111 is a microprocessor that controls the image forming apparatus 10 overall and connects to a peripheral, component interconnect (PCI) bus, etc., via the north bridge 112 that is a chip. The RAM 113 is a volatile memory used to store a program and/or data being processed temporarily when the CPU 111 controls the image forming apparatus 10.

The ASIC 114 is an IC designed for a specific purpose, and the RAM 115 is another volatile memory and is used to temporarily store a program used by the ASIC 114 and/or data being processed by the ASIC 114. The serial bus 117 and the USB 119 respectively connect the image forming apparatus 10 to peripheral devices, not shown.

The NIC 118 is an expansion card connected to an expansion slot, not shown. The USB host 120 connects the controller 110 and the authentication information input device (IC card R/W) 20 via a USB cable. The memory card interface 121 connects the controller 110 and a memory card that is a card-shaped storage device.

The operation unit 130, which may be an operation panel, inputs various instructions made by the user. The facsimile control unit 140 controls respective operations regarding facsimile transmission and receipt between the image forming apparatus 10 and an external device, not shown. The plotter 150 is a device to output data visually, and a printer can be used instead of the plotter 150. The scanner 160 reads original document data electronically. The IC card R/W (authentication information input device 20) reads information stored on an IC card and also writes information thereon.

It is to be noted that, alternatively, the image forming apparatus 10 can directly connect to the IC card R/W (authentication information input device 20), although the description above concerns an example in which the image forming apparatus 10 connects to the IC card R/W via the USB host 120 and the USB cable.

Further, it is to be noted that the IC card R/W is controlled by transmitting a command packet thereto. Because users' authentication information is transmitted through this USB communication path, commands and data transmitted therethrough can be encrypted to prevent leakage of personal information that might occur when this USB communication path is monitored.

Figure 4:
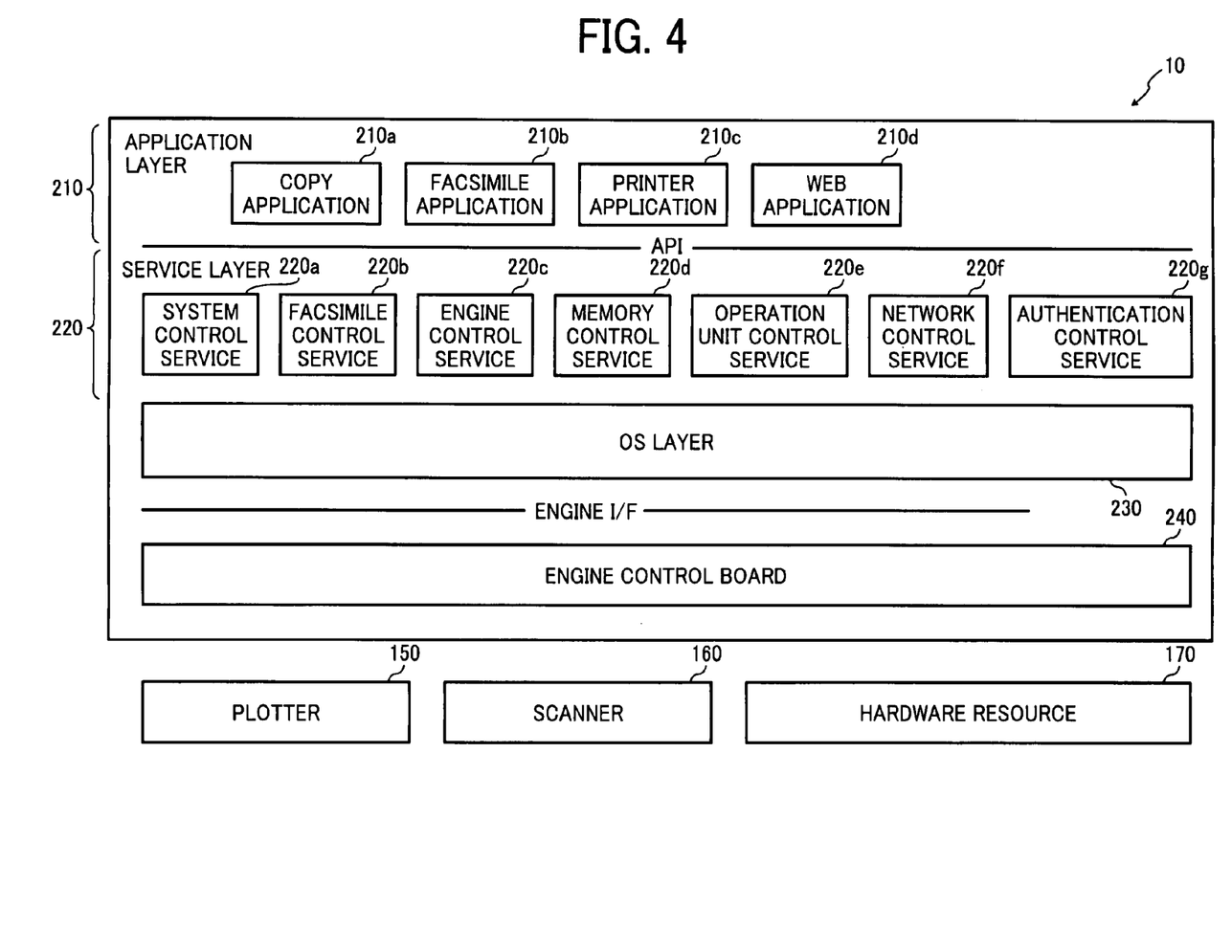
FIG. 4 illustrates an example of a software configuration of the image forming apparatus included in the authentication system shown in FIG. 1.

FIG. 4 shows a software configuration of the image forming apparatus 10 shown in FIG. 1.

As shown in FIG. 4, the software configuration of the image forming apparatus 10 includes an application layer 210, a service layer 220 including a, an operating system (OS) layer 230, and an engine control board or engine control layer 240.

It is to be noted that the hierarchical structure of the layers shown in FIG. 4 is based on a calling/called relation among the layers described above, in which an upper layer calls a layer located lower than that layer in FIG. 4.

In the application layer 210, application programs to execute respective functions of the image forming apparatus 10 including copying, facsimile transmission and receipt, printing, and Internet communication are implemented. For example, the application layer 210 includes a copy application 210a to execute functions regarding copying, a facsimile application 210b to execute functions regarding facsimile transmission and receipt, a printer application 210c to execute functions regarding printing, and a Web application 210d to execute functions regarding internet communication.

The service layer 220 includes subfunctions that are commonly used by the respective applications included in the application layer 210. For example, the service layer 220 includes a system control service 220a, a facsimile control service 220b, an engine control service 220c, a memory control service 220d, an operation unit control service 220e, a network control service 220f, and an authentication control service 220g.

The authentication service 220g authenticates the user so that the user can use the respective applications included in the application layer 210. The user can use each application only when the authentication processes are successful and the user logs therein. Usable applications are selectable for each user registered, and thus usable functions can be limited for each user using such personal authentication.

The OS layer 230 includes subfunctions that are commonly used by the respective services included in the service layer 220. The engine control board 240 includes programs that control the plotter 150, the scanner 160, and the hardware resource 170.

In the image forming apparatus 10 having the software configuration described above, the authentication service 220g performs authentication of users to enable the users to use each application included in the application layer 210.

Figure 5:
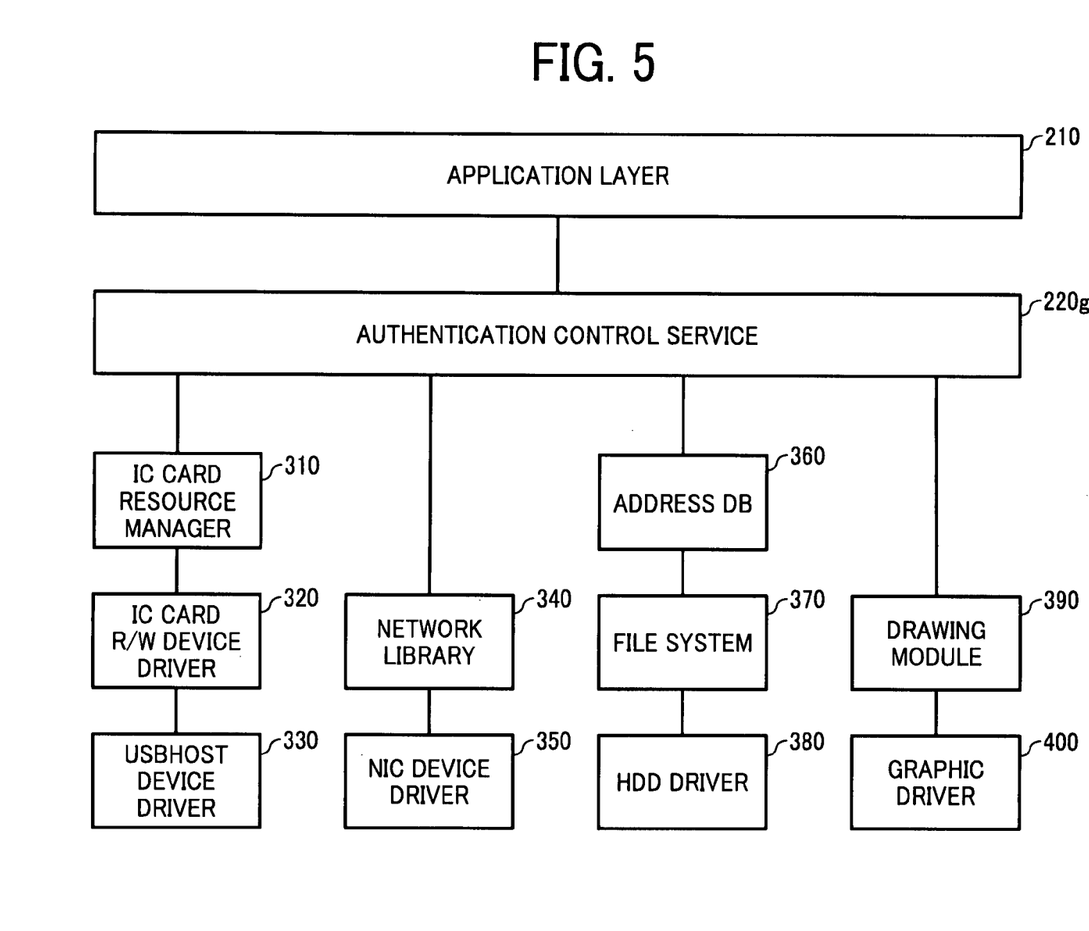
FIG. 5 illustrates an example of a configuration of a software module focusing on authentication control service.

FIG. 5 illustrates an example of a configuration of a software module, focusing on authentication control. An example of the authentication control service 220g is described in detail below, with reference to FIG. 5.

As shown in FIG. 5, the software module includes an IC card resource manager 310, an IC card R/W device driver 320, a USB host device driver 330, a network library 340, a network interface card (NIC) device driver 350, an address database (DB) 360, a file system 370, a HDD driver 380, a drawing module 390, and a graphic driver 400.

The authentication control service 220g receives authentication requests from the respective applications included in the application layer 210, and then performs processes described below as an example.

The authentication control service 220g instructs the operation unit 130 (operation panel) shown in FIG. 1 to display the authentication request via the drawing module 390 and the graphic driver 400. The authentication request enables the authentication control service 220g to receive authentication results from the external authentication server 30 shown in FIG. 1 via the NIC device driver 350 and the network library 340. Further, the authentication control service 220g outputs whether or not the user authentication is successful to the applications included in the application layer 210.

It is to be noted that, alternatively, the authentication control service 220g can directly obtain authentication information using the IC card R/W device 180, etc., that is locally connected to the USB host 120 via the IC card resource manager 310.

Figure 6:
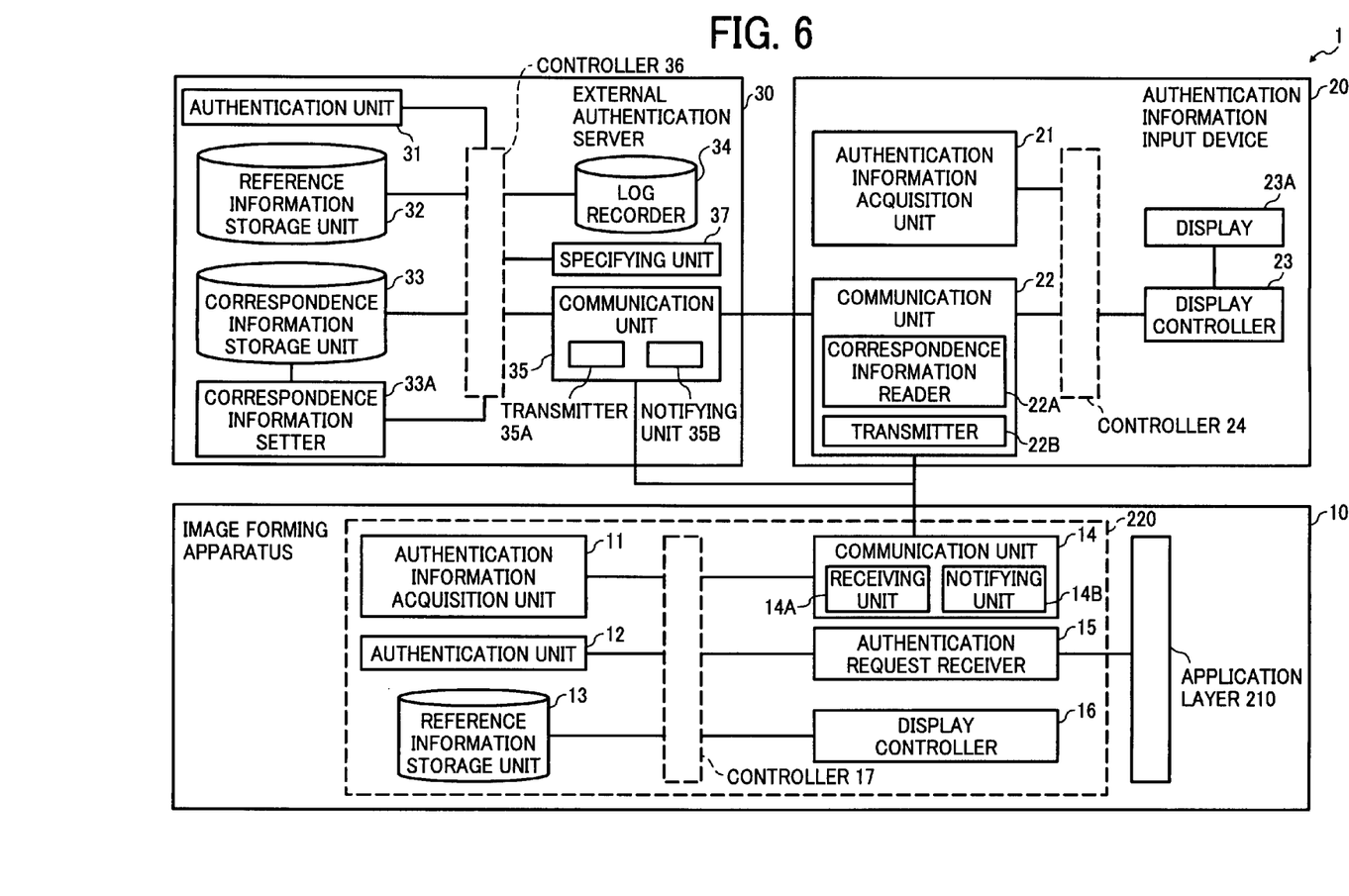
FIG. 6 illustrates an example of a functional configuration of the authentication system shown in FIG. 1.

FIG. 6 illustrates an example of a functional configuration of the authentication system 1 shown in FIG. 1.

As shown in FIG. 6, the image forming apparatus 10 includes an information acquisition unit (input unit) 11, an authentication unit 12, a reference information storage unit 13, a communication unit 14, an authentication request receiver (answer unit) 15, a display controller 16, and a controller 17 serving as an apparatus controller.

The authentication information input device 20 includes an information acquisition unit (input unit) 21, a communication unit 22, a display controller 23, and a controller 24. The external authentication server 30 includes an authentication unit 31, a reference information storage unit 32, a correspondence information storage unit 33, a correspondence information setter 33A, a log recorder 34, a communication unit 35, a controller 36, and a specifying unit 37.

The respective portions of the authentication information input device 20, the external authentication server 30, and the image forming apparatus 10 are described below, in that order.

In the authentication information input device 20, the information acquisition unit 21 acquires authentication information input by the user. For example, an IC card reader serving as the authentication information input device 20 acquires authentication information stored on an IC card presented by the user.

The communication unit 22 performs various processing relating to communication including transmitting the authentication information acquired by the information acquisition unit 21 to the external authentication server 30 and includes a correspondence information reader and a transmitting unit. The correspondence information reader reads the information regarding association between the authentication information input device 20 and the image forming apparatus 10. The transmitting unit transmits the information read by the correspondence information reader to the external authentication-server 30.

The display controller 23 controls display-related functions and displays that the image forming apparatus 10 is usable on a display 23A, such as a light-emitting diode (LED), when the external authentication server 30 notifies the authentication information input device 20 of same. The controller 24 controls respective portions of the authentication information input device 20, including the information acquisition unit 21, the communication unit 22, and the display controller 23.

In the external authentication server 30, the authentication unit 31 can perform user authentication through various types of authentication methods using the authentication information transmitted from the authentication information input device 20 via the communication unit 35 and reference information stored in the reference information storage unit 32. When the user is authenticated, the user can log in to the image forming apparatus 10.

It is to be noted that the authentication unit 31 processes the authentication information transmitted from the authentication information input device 20 according to types thereof, for example, converts the authentication information into referable data.

The reference information storage unit 32 stores information used as a reference in the authentication processes. The correspondence information storage unit 33 stores correspondence information that associates the authentication information input device 20 with the image forming apparatus 10, and an example of the correspondence information is described below using FIG. 9. The correspondence information is settable using the correspondence information setter 33A.

The log recorder 34 stores various logs. For example, the log recorder 34 records a notice that the image forming apparatus 10 is usable as a log for each image forming apparatus 10.

The communication unit 35 performs various processing relating to communication with the image forming apparatus 10 and the authentication information input device 20 and includes a transmitting unit and a notifying unit. The transmitting unit transmits the result of user authentication performed by the authentication unit 31, indicating whether the authentication processes have succeeded or failed, to the image forming apparatus 10 together with information about the user identified by the authentication information. The notifying unit notifies the authentication information input device 20 associated with the image forming apparatus 10 that the image forming apparatus 10 is usable, when the external authentication server 30 is so notified.

The controller 36 controls respective portions of the external authentication server 30 including the authentication unit 31, the reference information storage unit 32, the correspondence information storage unit 33, the log recorder 34, and the communication unit 35.

In the image forming apparatus 10, the authentication information acquisition unit 11 acquires authentication information, such as a user name and a password, input by the user. When the image forming apparatus 10 includes an operation panel, the user can input authentication information using the operation panel.

The authentication unit 12 performs authentication of the user using the authentication information acquired via the authentication information acquisition unit 11 and reference information stored in the reference information storage unit 13. Alternatively, the authentication unit 12 may transmit the authentication information to the external authentication server 30 and entrust user authentication to the external authentication server 30.

It is to be noted that, in the present embodiment, the authentication unit 31 of the external authentication server 30 supports various types of authentication methods, although the authentication unit 12 of the image forming apparatus 10 does not support various types of authentication methods. Thus, the image forming apparatus 10 can correspond to various types of authentication methods by entrusting user authentication to the external authentication server 30, without changing its configuration.

Alternatively, the authentication unit 12 of the image forming apparatus 10 may associate one or multiple types of authentication methods, and the reference information storage unit 13 can store different types of reference information corresponding to those different types of authentication methods.

The reference information storage unit 13 stores information used as a reference in the authentication processes. The communication unit 14 performs various processing relating to communication with the external authentication server 30 and the authentication information input device 20. For example, the communication unit 14 includes a receiving unit to receive results of user authentication from the external authentication server 30 and a notifying unit to notify the external authentication server 30 that the image forming apparatus is usable when the image forming apparatus 10 successfully authenticates a specific user and enters a state usable by that user, which is hereinafter referred to as a usable state or a log-in state.

The authentication request receiver (answer unit) 15 accepts authentication requests from the application layer 210 and answers those authentication requests. The display controller 16 controls what is to be displayed on a display, such as the operation panel, included in the image forming apparatus 10. The controller 17 controls the respective portions of the image forming apparatus 10 regarding authentication including the information acquisition unit (input unit) 11, the authentication unit 12, the reference information storage unit 13, the communication unit 14, the authentication request receiver (answer unit) 15, and the display controller 16.

In the authentication system 1 having the functional configuration described above, the user operates the authentication information input device 20 to get himself/herself authenticated, that is, the user input his/her authentication information, and then the external authentication server 30 performs the authentication processes. When the authentication processes have succeeded, the user can log in to the image forming apparatus 10 and use the image forming apparatus 10.

Figure 7:
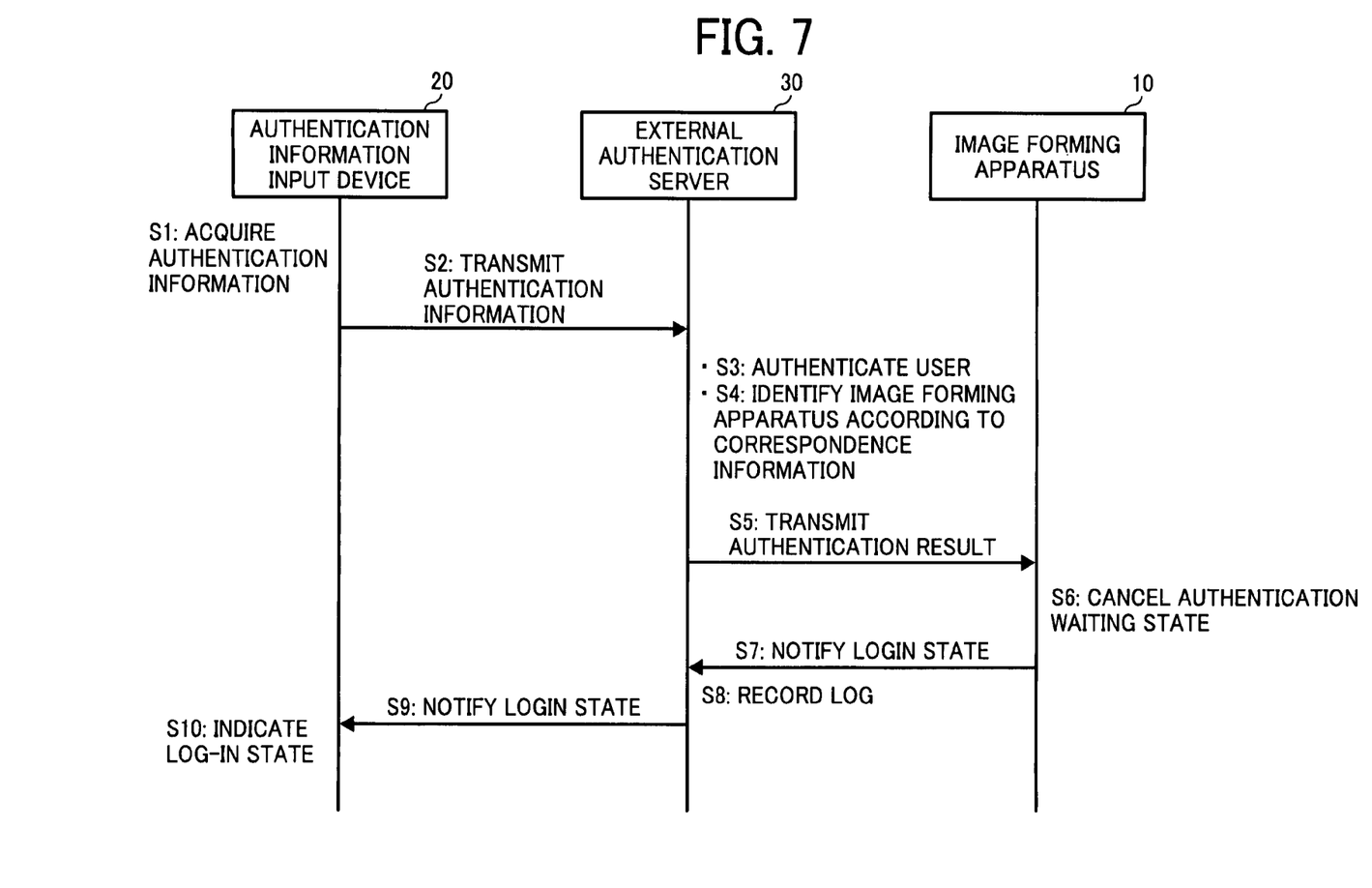
FIG. 7 illustrates an example of a sequence of authentication processes according to an illustrative embodiment of the present invention.

FIG. 7 illustrates an example of a sequence of authentication processes according to an illustrative embodiment of the present invention, which is described below with reference to FIG. 6.

At S1, the authentication information input device 20 acquires authentication information input by the user through authentication operations according to one of the authentication methods usable in the authentication system 1. For example, in a case of an authentication method using IC cards, the user puts his/her noncontact IC card close to the authentication information input device 20 or inserts his/her contact IC card into the authentication information input device 20, and the authentication information acquisition unit 21 acquires authentication information stored on the IC card.

Figure 8:
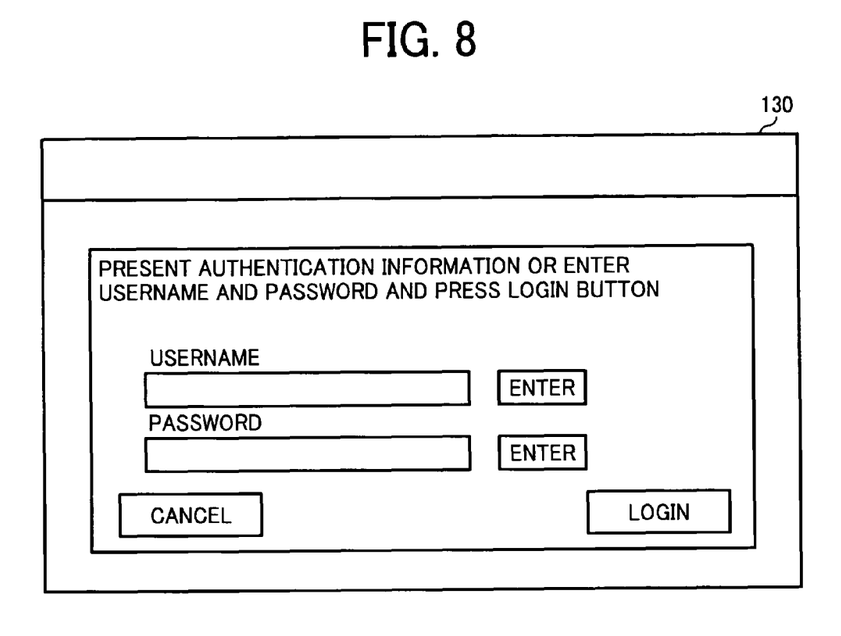
FIG. 8 illustrates an example of a screen display of a copy application prompting a user to input authentication information.

It is to be noted that at S1, the image forming apparatus 10 displays a screen to prompt the user to input authentication information as shown in FIG. 8. FIG. 8 is an example of a screen display of the copy application 210a shown in FIG. 4 to prompt the user to input authentication information.

While the authentication function of the image forming apparatus 10 is enabled, such a screen is displayed on a display or the operation unit 130 of the image forming apparatus 10 when the user activates the copy application 210a. The authentication information input device 20 acquires authentication information when the user present an authentication token according to the authentication method usable in the authentication system 1 to the authentication information input device 20. For example, the user presents an IC card in a case of authentication method using IC cards to the authentication information input device 20, or places his/her finger or palm thereon in a case of authentication method using biometric information.

At S2, the communication unit 22 of the authentication information input device 20 transmits the authentication information acquired at S1 to the external authentication server 30.

At S3, the external authentication server 30 authenticates the user. More specifically, the authentication unit 31 authenticates the user based on the authentication information received at S2 and the reference information stored in the reference information storage unit 32.

At S4, the specifying unit 37 of the external authentication server 30 specifies one or multiple image forming apparatus 10 associated with the authentication information input device 20 that sends authentication information at S2 according to the correspondence information stored in the correspondence information storage unit 33.

An example of the correspondence information is described below with reference to FIG. 9.

Figure 9:
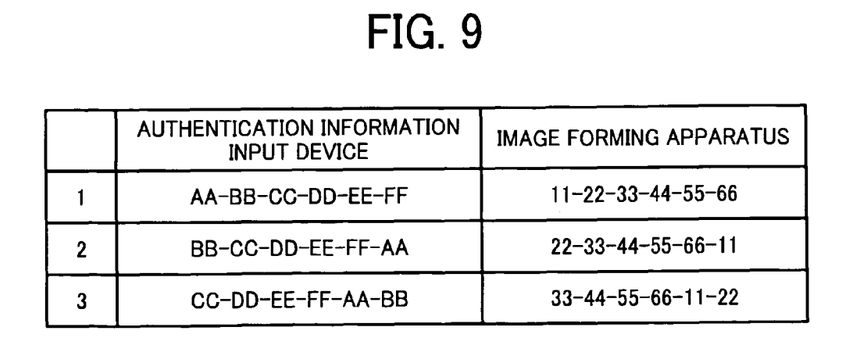
FIG. 9 illustrates an example of correspondence information stored in a correspondence information storage unit.

FIG. 9 shows an example of the correspondence information stored in the correspondence information storage unit 33. For example, as shown in FIG. 9, the association therebetween is managed by registering information specific to each of the authentication information input device 20 and the image forming apparatus 10, such as media access control (MAC) addresses thereof.

Although one authentication information input device 20 is associated with one image forming apparatus 10 in the example shown in FIG. 9, alternatively, one authentication information input device 20 may be associated with multiple image forming apparatus 10.

Specifying the image forming apparatus 10 using a correspondence table as shown in FIG. 9 has the following advantages: The image forming apparatus 10 and the authentication information input device 20 do not have a direct interface therebetween and operate in association with each other via the network, without depending on physical positional relation therebetween. By placing the authentication information input device 20 close to the image forming apparatus 10, the user can easily identify the image forming apparatus 10 that becomes usable when the user is authenticated using that authentication information input device 20.

Further, when one authentication information input device 20 is associate with multiple image forming apparatuses 10, the user can designate multiple image forming apparatuses 10 to be used simultaneously. Thus, multiple image forming apparatuses 10 become usable by performing the authentication processes once, which saves time for the user.

At S5, the external authentication server 30 transmits the result of the user authentication performed at S3 to one or multiple image forming apparatuses 10 identified at S4. More specifically, the communication unit 35 transmits the result of the user authentication performed by the authentication unit 31, whether the authentication processes have succeeded or failed, to the image forming apparatus 10 together with the information about the user identified by the authentication information.

At S6, when the result received at S5 indicates that the user authentication is successful, the image forming apparatus 10 displays one or more of usable applications on the display or the operation panel (operation unit 130) and cancels an authentication standby state. The controller 17 switches the image forming apparatus 10 from the unusable state to the usable state according to the result of the user authentication received at S5 and the user information.

Figure 10:
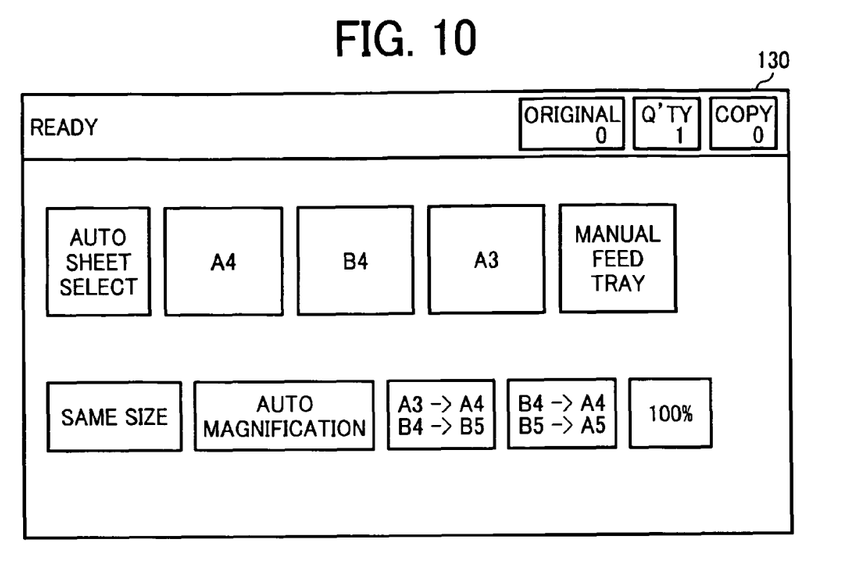
FIG. 10 illustrates an example of a screen display of a copy application that appears after the user is authenticated.
Figure 11:
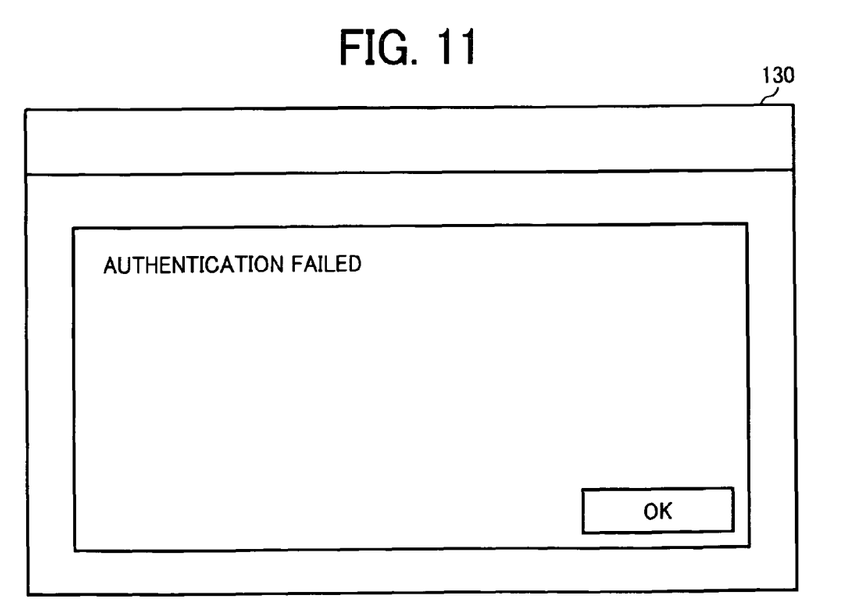
FIG. 11 is an example of a screen display when user authentication has failed.

For example, when the user authentication has succeeded, the controller 17 causes the display controller 16 to display a screen as shown in FIG. 10, allows the user to use (log in) the image forming apparatus 10, and enables the functions of the image forming apparatus 10. FIG. 10 shows an example of a screen display of the copy application 210a after the user is authenticated, and FIG. 11 shows an example of a screen display thereof when the authentication processes have failed.

At S7, when the result indicates the user authentication is successful, the communication unit 14 of the image forming apparatus 10 notifies the external authentication server 30 that the image forming apparatus 10 is in a usable state (log-in state). Thus, the external authentication server 30 can keep information indicating who logs in which image forming apparatus 10, and an administrator of the authentication system 1 can monitor the log-in state for each image forming apparatus 10.

At S8, the controller 36 of the external authentication server 30 records the state of the image forming apparatus 10 for each image forming apparatus 10 as a log in the log storage unit 34, according to the notification received at S7. Thus, because the external authentication server 30 records the login state of the image forming apparatus 10 as a log, the administrator can ascertain use of the image forming apparatus 10 by checking logs.

At S9, the external authentication server 30 notifies the authentication information input device 20 that the image forming apparatus 10 is logged in, which is reported by the image forming apparatus 10 at S7. More specifically, the communication unit 35 transmits a status of the image forming apparatus 10 to the authentication information input device 20 that is associated therewith by the correspondence information storage unit 33.

At S10, the authentication information input device 20 indicates that the image forming apparatus 10 is logged in using the display such as a LED. More specifically, the display controller 23 receives such notification from the external authentication server 30 via the communication unit 22 and then visually indicates that the image forming apparatus 10 is logged in by the user.

Thus, other users can be made aware that someone logs in to the image forming apparatus 10 associated with that authentication information input device 20 and whether or not authentication processes are available.

As described above, when the user operates the authentication information input device 20 to be authenticated, the external authentication server 30 performs the authentication processes. The user can start the image forming apparatus 10 after user authentication by the external authentication server 30 is successful.

The present embodiment provides advantages described below.

Because the external authentication server 30 can control the authentication information input device 20, acquire authentication information therefrom, and process the authentication information, various types of authentication information input devices 20 can be used without changing the configuration of the image forming apparatus 10.

It is to be noted that when the correspondence information, stored in the correspondence information storage unit 33, that associates authentication information input device 20 and the image forming apparatus 10 is settable using the correspondence information setter 33A, an editor of the correspondence information can be limited to only the administrator, preventing the users from changing the correspondence information for their own convenience.

Further, when the information on the basis of which the user identifies a usable image forming apparatus 10 is stored on authentication tokens, such as IC cards, registration of such information in the external authentication server 30 is not necessary. For example, even when the user visits other business places, the user can identify a usable image forming apparatuses 10 by using his/her authentication token.

As can be appreciated by those skilled in the art, combination of the constituents of the embodiments described above and other elements is not limited to those described therein.

Numerous additional modifications and variations are possible in light of the above teachings. It is therefore to be understood that, within the scope of the appended claims, the disclosure of this patent specification may be practiced otherwise than as specifically described herein.

What is claimed is:

1. An authentication system, comprising:
a single authentication information input device for multiple image forming apparatuses, the authentication information input device including an authentication information input unit, a display, and a first communication unit, the authentication information input device being a device through which a user inputs authentication information;
an authentication server including a second communication unit, an authentication unit, and a specifying unit, the second communication unit being configured to acquire the authentication information from the first communication unit of the authentication information input device and the authentication unit is configured to perform user authentication based on the authentication information; and
multiple image forming apparatuses, each including a receiver and an apparatus controller, wherein
the authentication information input device, the authentication server, and the multiple image forming apparatuses are connected to each other via a network,
the specifying unit being executable by a controller of the authentication server and configured to specify at least two image forming apparatuses among the multiple image forming apparatuses based on the authentication information,
the second communication unit of the authentication server is configured to transmit a result of the user authentication indicating whether or not the user authentication is successful and information of the user identified by the authentication information to the at least two specified image forming apparatuses specified by the specifying unit of the authentication server,
the receiver of the at least one specified image forming apparatus is configured to receive the result of the authentication and the user information transmitted from the authentication server, and
the apparatus controller is configured to switch the image forming apparatus from an unusable state to a usable state according to the result of the user authentication and the user information, wherein the authentication server further comprises
a notifying unit executable by a controller of the authentication server and configured to notify the authentication information input device associated with the image forming apparatus that the image forming apparatus is usable, when the authentication server receives a notice that the image forming apparatus is usable from the image forming apparatus,
wherein the display of the authentication information input device is configured to visually indicate that the image forming apparatus associated with the authentication information input device is usable when receiving the notice that the image forming apparatus is usable from the authentication server.

2. The authentication system according to claim 1, wherein the image forming apparatus further comprises a notifying unit executable by the apparatus controller of the image forming apparatus and configured to notify the authentication server that the image forming apparatus is usable when the apparatus controller switches the image forming apparatus from the unusable state to the usable state.

3. The authentication system according to claim 1, wherein the authentication server further comprises a correspondence information storage unit configured to store information that associates the authentication information input device with at least two of the multiple image forming apparatuses, and
the second communication unit of the authentication server transmits the result of the user authentication and the user information to the image forming apparatus associated with the authentication information input device.

4. The authentication system according to claim 1, wherein the authentication server further comprises a log recorder configured to record that the image forming apparatus is usable as a log when the authentication server receives the notice that the image forming apparatus is usable from the image forming apparatus.

5. The authentication system according to claim 3, wherein the authentication server further comprises a correspondence information setter configured to set the information, stored in the correspondence information storage unit, that associates the authentication information input device with the image forming apparatus.

6. The authentication system according to claim 5, wherein the authentication information input device comprises:
a correspondence information reader configured to read the information that associates the authentication information input device with the image forming apparatus; and a transmitter configured to transmit the information read by the correspondence information reader to the authentication server.

7. An image forming apparatus used in an authentication system in which a single authentication information input device, for multiple image forming apparatuses, to which a user inputs authentication information, an authentication server configured to acquire the authentication information from the authentication information input device and perform user authentication based on the authentication information, and multiple image forming apparatuses are connected to each other via a network, the image forming apparatus comprising:
a receiver configured to receive a result of the user authentication and user information transmitted from the authentication server; and
an apparatus controller configured to switch the image forming apparatus from an unusable state to a usable state upon receiving the result of the user authentication and the user information from the single authentication information input device which is remote from the image forming apparatus and includes a display,
wherein
the authentication server further includes a notifying unit executable by a controller of the authentication server and configured to notify the authentication information input device associated with the image forming apparatus that the image forming apparatus is usable, when the authentication server receives a notice that the image forming apparatus is usable from the image forming apparatus,
wherein the display of the authentication information input device is configured to visually indicate that the image forming apparatus associated with the authentication information input device is usable when receiving the notice that the image forming apparatus is usable from the authentication server.

8. The image forming apparatus according to claim 7, further comprising:
a notifying unit executable by an apparatus controller of the image forming apparatus and configured to notify the authentication server that the image forming apparatus is usable when the apparatus controller switches the image forming apparatus from the unusable state to the usable state.

9. An authentication server used in an authentication system in which a single authentication information input device, for multiple image forming apparatuses, to which a user inputs authentication information, the authentication server configured to acquire the authentication information from the authentication information input device and perform user authentication based on the authentication information, and multiple image forming apparatuses are connected to each other via a network, the authentication server comprising:
a specifying unit executable by a controller of the authentication server and configured to specify at least two image forming apparatuses among the multiple image forming apparatuses based on the authentication information received from the single authentication information input device located remote from the authentication server;
a communication unit configured to transmit a result of the user authentication indicating whether or not the user authentication is successful and user information of the user identified by the authentication information to the at least two specified image forming apparatuses; and
a notifying unit executable by the controller of the authentication server and configured to notify the authentication information input device associated with the image forming apparatus that the image forming apparatus is usable, when the authentication server receives a notice that the image forming apparatus is usable from the image forming apparatus, wherein
when receiving the notice that the image forming apparatus is usable from the authentication server, the authentication information input device visually indicates that the image forming apparatus associated with the authentication information input device is usable on a display.

10. The authentication server according to claim 9, further comprising:
a correspondence information storage unit configured to store information that associates the authentication information input device with at least one of the image forming apparatuses,
wherein the communication unit is configured to transmit the result of the user authentication and the user information to the image forming apparatus associated with the authentication information input device.

11. The authentication server according to claim 9, further comprising:
a log recorder configured to record that the image forming apparatus is usable as a log when the authentication server receives the notice that the image forming apparatus is usable from the image forming apparatus.

12. The authentication server according to claim 9, further comprising:
a correspondence information setter, configured to set the information, stored in the correspondence information storage unit, that associates the authentication information input device with the image forming apparatus.

13. The authentication system according to claim 1, wherein the authentication information input device is common to the multiple image forming apparatuses.

14. The image forming apparatus according to claim 7, wherein the authentication information input device is common to multiple image forming apparatuses.

15. The authentication server according to claim 9, wherein the authentication information input device is common to the multiple image forming apparatuses.

* * * * *